United States Patent
Atterbury

[19]

[11] Patent Number: 5,822,997
[45] Date of Patent: Oct. 20, 1998

[54] THERMOSTAT SETBACK RECOVERY METHOD AND APPARATUS

[75] Inventor: William G. Atterbury, Columbus, Ohio

[73] Assignee: Gas Research Institute, Chicago, Ill.

[21] Appl. No.: 760,044

[22] Filed: Dec. 4, 1996

Related U.S. Application Data

[60] Provisional application No. 60/008,381 Dec. 8, 1995.

[51] Int. Cl.⁶ .................. F23N 5/20; F25D 17/00
[52] U.S. Cl. .................. 62/180; 62/228.4; 165/239; 236/46 R
[58] Field of Search .................. 236/46 R; 62/180, 62/228.4; 165/239

[56] References Cited

U.S. PATENT DOCUMENTS

| | | | |
|---|---|---|---|
| 4,228,846 | 10/1980 | Smorol | 62/160 X |
| 4,266,599 | 5/1981 | Saunders | 62/157 X |
| 4,334,576 | 6/1982 | Fuchek | 236/46 R |
| 4,384,461 | 5/1983 | Kurtz | 62/157 |
| 4,557,317 | 12/1985 | Harmon, Jr. | 236/46 R |
| 4,706,882 | 11/1987 | Barnard | 236/46 |
| 4,828,016 | 5/1989 | Brown et al. | 236/46 R |
| 4,911,358 | 3/1990 | Mehta | 165/239 X |
| 4,991,400 | 2/1991 | Wilkinson | 62/228.4 |
| 5,003,788 | 4/1991 | Fischer | 62/238.7 |
| 5,029,449 | 7/1991 | Wilkinson | 62/175 |
| 5,115,967 | 5/1992 | Wedekind | 236/46 R |
| 5,249,742 | 10/1993 | Atterbury et al. | 237/2 B |
| 5,309,730 | 5/1994 | Strand et al. | 62/228.4 |
| 5,314,004 | 5/1994 | Strand et al. | 165/267 |
| 5,555,927 | 9/1996 | Shah | 165/239 |

*Primary Examiner*—William E. Wayner
*Attorney, Agent, or Firm*—Dick and Harris

[57] ABSTRACT

A thermal conditioning system is provided which is configured for setback operations. The source of thermal conditioning is preferably a gas driven heat pump. Control is provided such that during the recovery process, the operation of the heat pump is varied to accommodate changes in loading on the system. In addition, the control apparatus is configured to vary the start time of the recovery period as a function of recent system performance.

15 Claims, 12 Drawing Sheets a) PREVIOUS DAYS OPERATION
b) CURRENT DAYS OPERATION a) PREVIOUS DAYS OPERATION
b) CURRENT DAYS OPERATION

THERMOSTAT SETBACK RECOVERY METHOD AND APPARATUS

This application depends from and claims priority of U.S. Provisional Application No. 60/008,381, filed Dec. 8, 1995.

BACKGROUND OF THE INVENTION

1. Field of the Invention

The present invention is directed to methods and apparatus for setback recovery of thermostats in heat pumps. In particular, the present invention is applicable to variable speed heat pumps, typically refrigerant vapor compression heat pump systems that are driven by combustion engine prime movers.

2. Background Art

Prior art in the field includes some complex systems for controlling setback recovery times in heat pumps and other heating and cooling apparatus. Such systems do not include variable speed operation to minimize cycling between on and off during recovery and optimize efficiency. Neither do such prior art systems utilize interior temperature drift during the setback period in determining the recovery time required.

Current electronic thermostats for residential heating and cooling systems permit the homeowner to set back the temperature setpoint during a preprogrammed period of time, which permits the system to operate at a lower overall cost. Recovery from setback causes the system to run continuously until the new setpoint is achieved. Recovery occurs quickly with gas furnaces because of their sizable capacity compared to the house heating load. Recovery from a setback for an electric heat pump (EHP) could cause supplementary strip heaters to be activated. Such strip heaters are much less efficient than heat pumps, so most programmable thermostats for EHPs suppress operation of the strip heaters during recovery. The capacity available from an EHP is typically much less than that from a gas furnace for a building of comparable size, so the recovery time typically is several times greater. Recovery time for an EHP is also dependent upon outdoor conditions, mainly temperature and humidity, which makes it difficult to determine how long it will take the building to recover from the setback.

One of the most advanced thermostats commercially available for residential use (Honeywell T8611) has an intelligent recovery scheme that determines when to start the system so that the recovery from setback is achieved by the time selected by the homeowner. The Honeywell thermostat accomplishes this by determining how long the system took to recover from setback on the previous day. This method works well for a single speed system when the weather patterns are stable. The method can be adversely affected by changes in weather patterns and is non-optimal for a variable speed heating and cooling system because the thermostat runs the system at its highest speed where the heating and cooling system may not be most efficient.

SUMMARY OF THE INVENTION

The present invention is directed to a thermal conditioning system for spaces. The thermal conditioning system includes a variable speed heat pump, wherein the thermal conditioning system operates between a first normal operations mode, and a second thermal conditioning setback mode.

A method is provided for the recovery of the thermal conditioning of the space from a setback period, the method comprising the steps of:

a) turning off or setting back the thermal conditioning system at a time $t1a$ at the beginning of the first cycle of setback and recovery;

b) recording a normal setpoint temperature $T1a$ when the thermal conditioning system is turned off or set back at the beginning of the first cycle of setback and recovery;

c) permitting the space temperature to drift, towards a predetermined beginning setback setpoint temperature $T2a$;

d) restarting the thermal conditioning system, at a time $t2a$, once a first predetermined condition has been achieved, toward maintaining the beginning setback setpoint temperature;

e) adjusting the operation of the thermal conditioning system, at a time $t3a$, toward recovery of the thermal conditioning of the space to normal operation during the first cycle of setback and recovery;

f) recording the ending setback setpoint temperature, $T3a$, when the thermal conditioning system is adjusted for setback recovery during the first cycle of setback and recovery;

g) adjusting the thermal conditioning system toward returning the thermal conditioning system to normal operation;

h) ending recovery by maintaining normal operation once a second predetermined condition has been attained;

i) recording the time $t4a$ when setback recovery was ended during the first cycle of setback and recovery;

j) recording the ending normal setpoint temperature $T4a$ when setback recovery was ended during the first cycle of setback and recovery;

k) turning off or setting back the thermal conditioning system at the time $t1b$ at the beginning of a subsequent cycle of setback and recovery;

l) recording the normal setpoint temperature $T1b$ when the thermal conditioning system is turned off or set back at the beginning of the subsequent cycle of setback and recovery;

m) permitting the space temperature to drift, towards a predetermined beginning setback setpoint temperature $T2b$;

n) turning on the thermal conditioning system at time $t2b$, once a predetermined third condition has been achieved, to maintain the desired setback thermal conditioning during the subsequent cycle of setback and recovery;

o) selecting the ending setback setpoint temperature $T3b$ when thermal conditioning system is to be started for setback recovery during a subsequent cycle of setback and recovery;

p) selecting an ending normal setpoint temperature $T4b$ at which point the setback recovery is to be ended during the current cycle of setback and recovery;

q) selecting a time $t4b$ at which point the setback recovery is to be ended during the current cycle of setback and recovery;

r) determining the ending setback setpoint time $t3b$ at which point the thermal conditioning system is to be started for setback recovery during the current cycle of setback and recovery; and s) restarting the thermal conditioning system at the determined ending setback setpoint time.

The present method further comprises the step of repeating steps a–r for each successive cycle of setback and recovery.

In a preferred embodiment of the invention, the step q) of determining the ending setback setpoint time t3b is accomplished in accordance with $$t3b=t4b-(t4a-t3a)*\{(T4b-T3b)/(T4a-T3a)*(T2b-T1b)/(t2b-t1b)/[(T2a-T1a)/(t2a-t1a)]\}.$$

Preferably, the first predetermined condition comprises the attainment of the predetermined beginning setback setpoint temperature T2a. Alternatively, the first predetermined condition comprises the passage of a predetermined amount of elapsed time following turn-off or set back of the thermal conditioning system.

Preferably, the second predetermined condition comprises the attainment of a predetermined normal operations temperature. Alternatively, the second predetermined condition comprises the passage of a predetermined amount of elapsed time.

The thermal conditioning system is a gas engine driven heat pump, preferably.

Preferably, the third predetermined condition comprises the attainment of the predetermined beginning setback setpoint temperature T2b. Alternatively, the third predetermined condition comprises the passage of a predetermined amount of elapsed time following turn-off or set back of the thermal conditioning system during the subsequent cycle.

In a preferred embodiment of the invention, the method further comprises the step of periodically calculating the ending setback setpoint time t3b at which point the thermal conditioning system is to be started for setback recovery during the current cycle of setback and recovery, utilizing the current time at each periodic calculation as the value for the time t2b, when the current time is later than the original time t2b and the space temperature is greater than T2b, if the system is in a heating mode, or the space temperature is less than T2b, if the system is in a cooling mode.

The present invention also includes a thermal conditioning system for the thermal conditioning of a space, the thermal conditioning apparatus being configured to operate in a normal operations mode and a setback operations mode.

The thermal conditioning system comprises means for providing thermally conditioned air to a space; means for sensing the temperature of the air in the space; user programmable means for regulating the operation of the means for providing thermally conditioned air so as to maintain a substantially constant air temperature in the space, the user programmable means being further configured to vary the rate at which thermally conditioned air is supplied to the space according to a time-referenced schedule such that the rate of thermal conditioning is setback for a period of time at substantially regular intervals of time, the thermal conditioning system thereafter undergoing recovery from the setback operation to normal operations.

The user programmable means is further operably connected to the means for providing thermally conditioned air to the space, the sensing means, the recording means and the correlating means. The user programmable means further includes means for accommodating changes in loading on the means for providing thermally conditioned air such that recovery from setback operation occurs at substantially the same time during each of said substantially regular intervals of time.

In a preferred embodiment of the invention, the means for accommodating changes in loading further comprises means for recording the temperature of the air in the space; means for correlating the recorded temperatures to a time reference; and means for determining when to increase the rate of delivery of thermally conditioned air to the space during recovery, relative to changes in loading on the thermal conditioning system, in order to accomplish recovery at substantially the same time during each of the regular intervals of time.

The means for determining when to increase the rate of delivery of thermally conditioned air during recovery operates according the to the relationship $$t3b=t4b-(t4a-t3a)*\{(T4b-T3b)/(T4a-T3a)*(T2b-T1b)/(t2b-t1b)/[(T2a-T1a)/(t2a-t1a)]\}$$

wherein t1a=time when system enters setback operation at beginning of a first interval of time;

T1a=normal setpoint temperature when system enters setback operation at beginning of the first interval of time;

t1b=time when system enters setback operation at beginning of a subsequent interval of time;

T1b=normal setpoint temperature during system setback operation during the subsequent interval of time;

T2b=beginning setback setpoint temperature during system setback during the subsequent interval of time;

t2b=time when system established beginning setback setpoint temperature during system setback during the subsequent interval of time;

T3a=ending setback setpoint temperature during first interval of time, at beginning of recovery;

t3a=time when recovery is begun during the first interval of time;

T3b=ending setback setpoint temperature when recovery is begun during subsequent interval of time;

T4a=ending normal setpoint temperature when recovery is ended during first interval of time;

t4a=time when setback recovery is ended during first interval of time;

T4b=ending normal setpoint temperature when recovery is ended during the subsequent interval of time;

t4b=time when the setback recovery is to be ended during the subsequent interval of time; t3b=ending setback setpoint time when the recovery is to be started during the subsequent interval of time.

In a preferred embodiment of the invention, the means for accommodating changes in loading is further operably configured to monitor the rate of recovery of the system to normal operation and cause the user programmable control means to further vary the rate of delivery of thermally conditioned air, relative to ongoing changes in loading of the system.

BEST MODE FOR PRACTICING THE INVENTION

Figure 1:
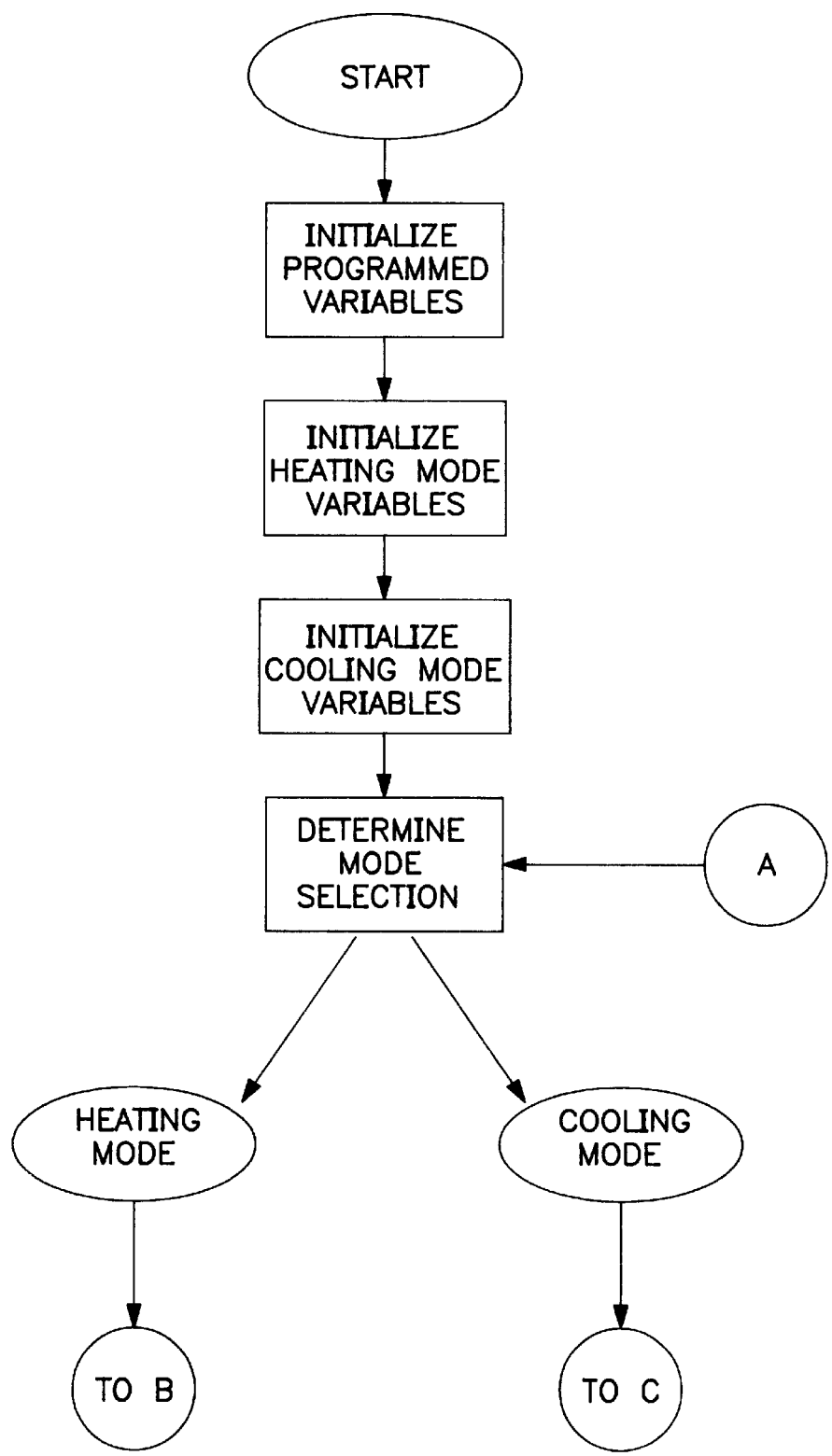
FIG. 1 is a schematic diagram of an initial phase of operations in a setback recovery system according to the present invention.

While this invention is susceptible of embodiment in many different forms, there is shown in the drawings and will herein be described in detail, several specific embodiments with the understanding that the present disclosure can be considered as an exemplification of the principles of the Invention and is not intended to limit the Invention to the embodiments illustrated.

The present invention provides improved setback recovery which is especially well suited to the operation of gas engine heat pumps (GEHP), but can be applied to any variable speed heat pump system to increase efficiency and reduce overall heating and cooling system operating costs. The present invention is effective when used by itself and can also be integrated with existing setback recovery technology to further improve the overall operation of the setback recovery feature, especially when used with variable speed gas engine heat pump systems.

The general principle of setback operations is that, during heating seasons for example, the house temperature will be set back to a lower temperature (e.g., 65° F.) during evening hours, and will return to a higher temperature (e.g., 70° F.) during daylight hours. In cooling seasons, the reverse may take place (to take advantage of the natural cooling which generally occurs at night). Setback can be achieved by cycling (on/off) of the thermal conditioning system. In an alternative embodiment (one employing a gas driven heat pump with a variable speed compressor), the system speed can be varied over a wide range of rates, which will enable cycling to be avoided in many circumstances. In such an operation, setback is achieved simply by reducing the compressor speed of the heat pump to minimum during setback hours.

The present invention includes an improved method for determining when to start a heat pump during a setback period. The actual functions relating to temperature decay and temperature recovery in an enclosed space are exponential in nature, and may be best expressed by the exponential decay function:

$$T = a + b * exp^{(-c*t)}$$

Indoor temperature data can be used to evaluate this function at three discrete times resulting in three equations with three unknowns. Although a closed form solution to this equation does not exist, the function can be solved utilizing conventional numerical analysis techniques, and a programmable controller could be configured, based upon this function, to operate the system of the present invention. However, for most if not all typical residential and commercial thermal conditioning applications, the responses of an enclosed space to thermal drift or temperature recovery are substantially linear. Accordingly, the calculation of the time to begin recovery from a setback period, when taking into account not only the time required for recover during the previous cycle, but also the temperature versus time characteristics of the time period outside of the recovery period during the previous cycle (including the fall-off in temperature following setback recovery), is as follows:

$$t3b = t4b - (t4a - t3a) * \{(T4b - T3b)/(T4a - T3a) * (T2b - T1b)/(t2b - t1b)/[(T2a - T1a)/(t2a - t1a)]\}$$

wherein t1a=time when heat pump system was turned off or set back to minimum speed at beginning of most recent prior cycle of setback and recovery;

T1a=normal setpoint temperature when heat pump system was turned off or set back to minimum speed at beginning of most recent prior cycle of setback and recovery;

t1b=time when system was turned off or set back to minimum speed at the beginning of the current cycle of setback and recovery;

T1b=normal setpoint temperature when system was turned off or set back to minimum speed at the beginning of the current cycle of setback and recovery;

T2b=beginning setback setpoint temperature when system is turned on or sped up to maintain the temperature during setback operations;

t2b=time when system was turned on or increased to maintain approximately the temperature T2b during current cycle of setback and recovery;

T3a=ending setback setpoint temperature when heat pump was started or sped up for setback recovery during last previous cycle of setback and recovery;

t3a=time when heat pump was started or sped up for setback recovery during last previous cycle of setback and recovery;

T3b=ending setback setpoint temperature when heat pump is to be started or sped up for setback recovery during the current cycle of setback and recovery;

T4a=ending normal setpoint temperature when setback recovery was ended during last previous cycle of setback and recovery;

t4a=time when setback recovery was ended during last previous cycle of setback and recovery;

T4b=ending normal setpoint temperature when the setback recovery is to be ended during the current cycle of setback and recovery;

t4b=time when the setback recovery is to be ended during the current cycle of setback and recovery;

t3b=ending setback setpoint time when the heat pump is to be started or sped up for setback recovery during the current cycle of setback and recovery.

This adaptive recovery scheme accounts for house load, system capacity, and weather during the previous setback period, which is typically only several hours before the return from setback begins. The relationship is expressed in linear terms, which assumes that the thermal response of the house is linear—generally an appropriate assumption for simplified approximately optimal designs.

Figure 11:
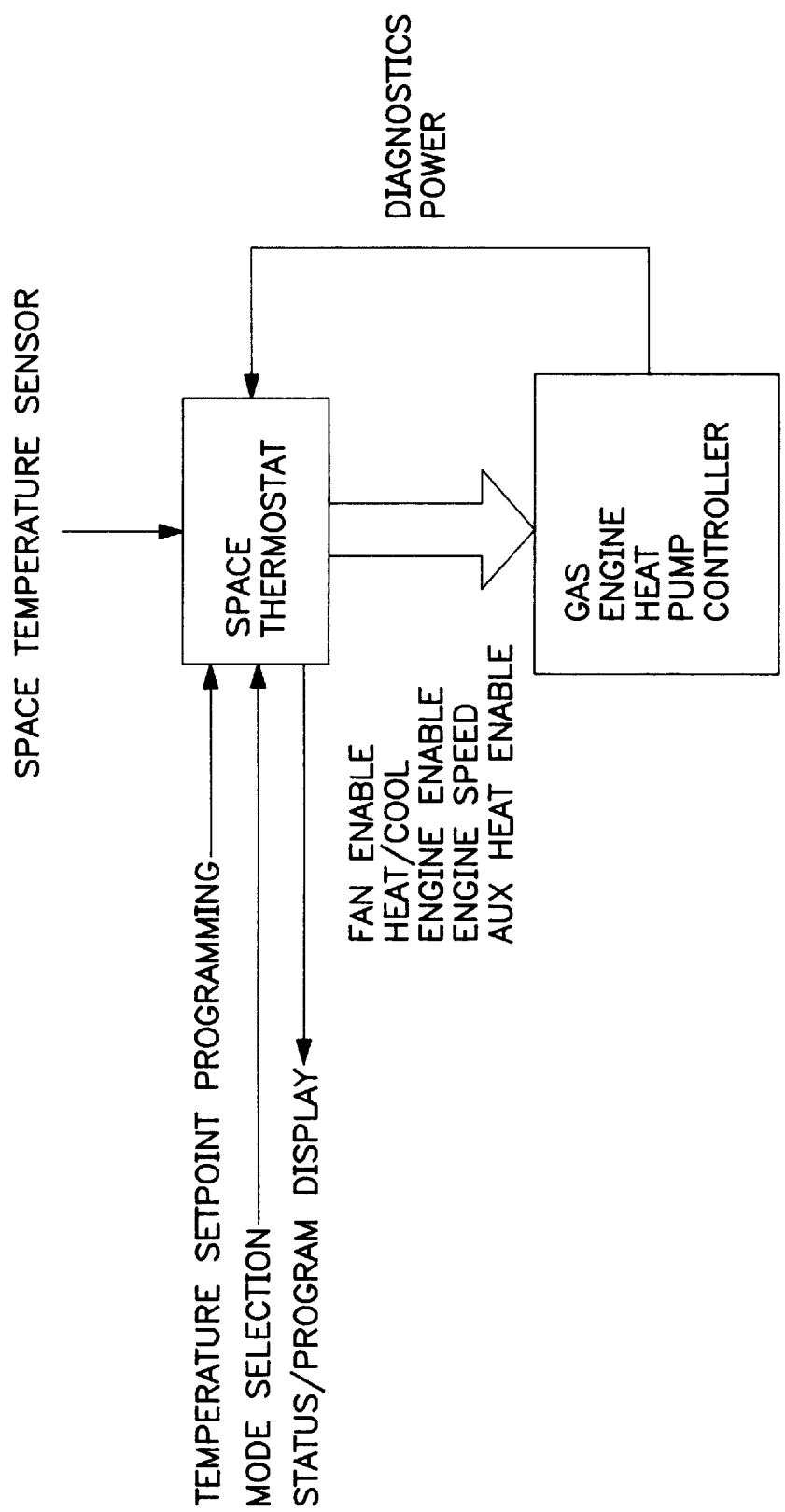
FIG. 11 is a schematic illustration of a control apparatus for use with the setback recovery scheme of the present invention.

FIGS. 1–5 illustrate a typical method, according to a preferred embodiment of the invention, for practicing the improved setback recovery method. Following initial start-up (which may be prompted by timing following the previous operating cycle, or which may be manually prompted by the user), the controller (FIG. 11) will initialize the preprogrammed values stored in the controller, such as the target recovery slope (change in temperature versus time) and target recovery speed starting values. The controller then determines the mode selection (A), either based upon manual entry by a user, or based upon stored data regarding the previous (i.e., most recently observed) system behavior (such as the space temperature drift). Depending upon whether the heating mode (B, see FIG. 2) or cooling mode (C, see FIG. 3) is determined, the controller proceeds to follow the appropriate steps for heating or cooling.

Figure 2:
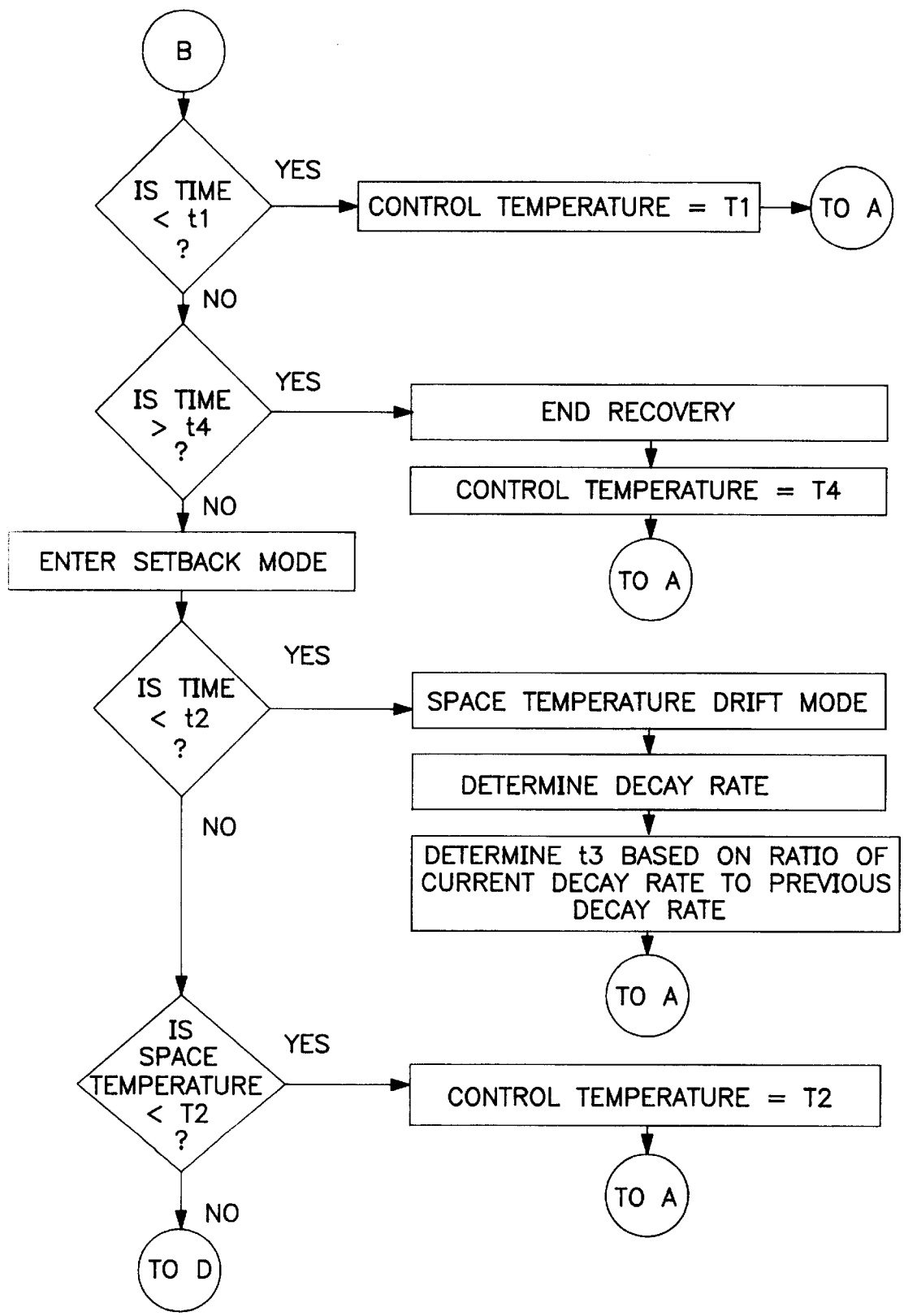
FIG. 2 is a schematic diagram of a further heating mode phase of operations of the setback recovery system according to FIG. 1.
Figure 3:
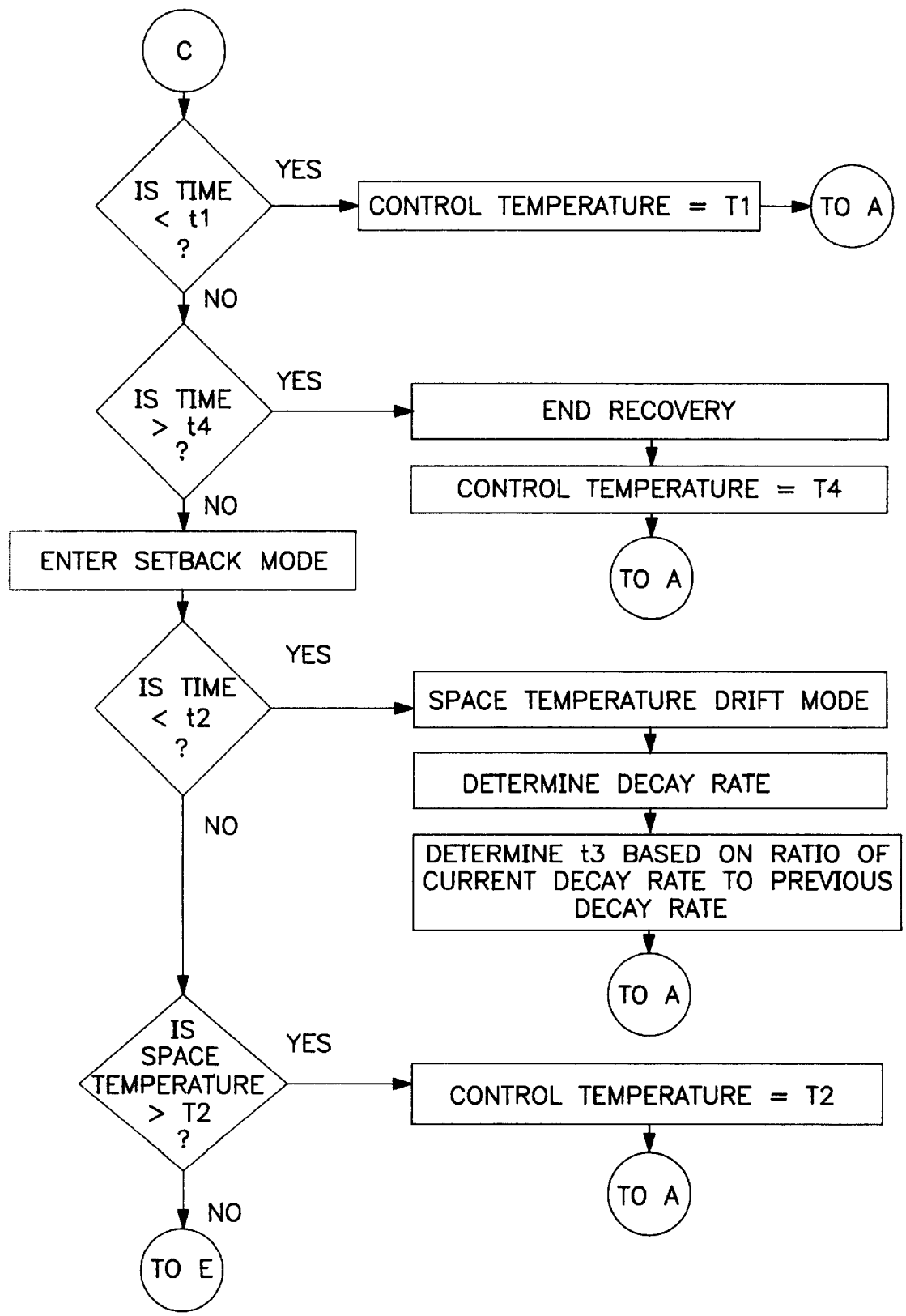
FIG. 3 is a schematic diagram of a further cooling mode phase of operations of the setback recovery system according to FIG. 1.

If heating mode (B) has been determined, the controller will follow the procedure described in FIG. 2. If the elapsed time is less than t1, then the controller directs the system to maintain the temperature at the setpoint temperature during normal operation (T1), against the temperature load of the house. The controller returns to step A (FIG. 1) to reconfirm the mode selection.

As soon as the elapsed time is greater than or equal to t1, then the controller determines whether the elapsed time is less than t4. If the time is greater than or equal to t4, this is a signal that confirms that the recovery period has just ended, and the controller will operate the heat pump to maintain the house at the setpoint temperature after recovery (T4), which typically will be the same as T1, unless a new value has been programmed into the controller in the interim. The controller will then return to step A and reconfirm the mode of operation.

If the time is less than t4, but greater than t1, then the system will enter the setback mode. If the time is also less than t2, the heat pump will be shut off or, preferably, set back to minimum speed (so as to avoid cycling penalties) and the space temperature will be allowed to drift. The space temperature during the drift period will be monitored. t3 will then be determined, as a function of the ratio of the current decay rate, versus the previous decay rate, based upon the various recorded temperatures and times, and the controller will return to step A.

Figure 4:
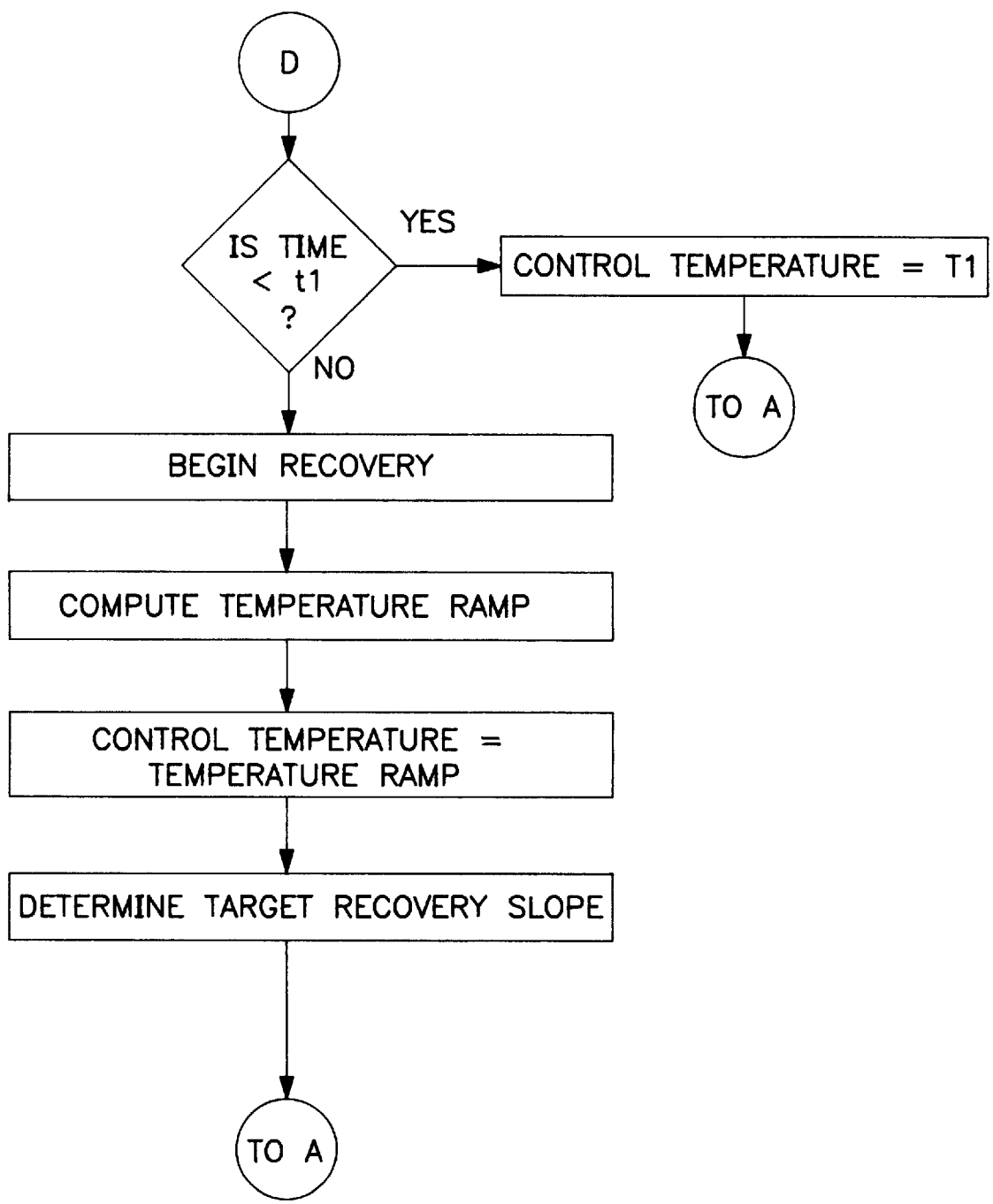
FIG. 4 is a schematic diagram of a further phase of operations of the setback recovery system according to FIG. 1.
Figure 5:
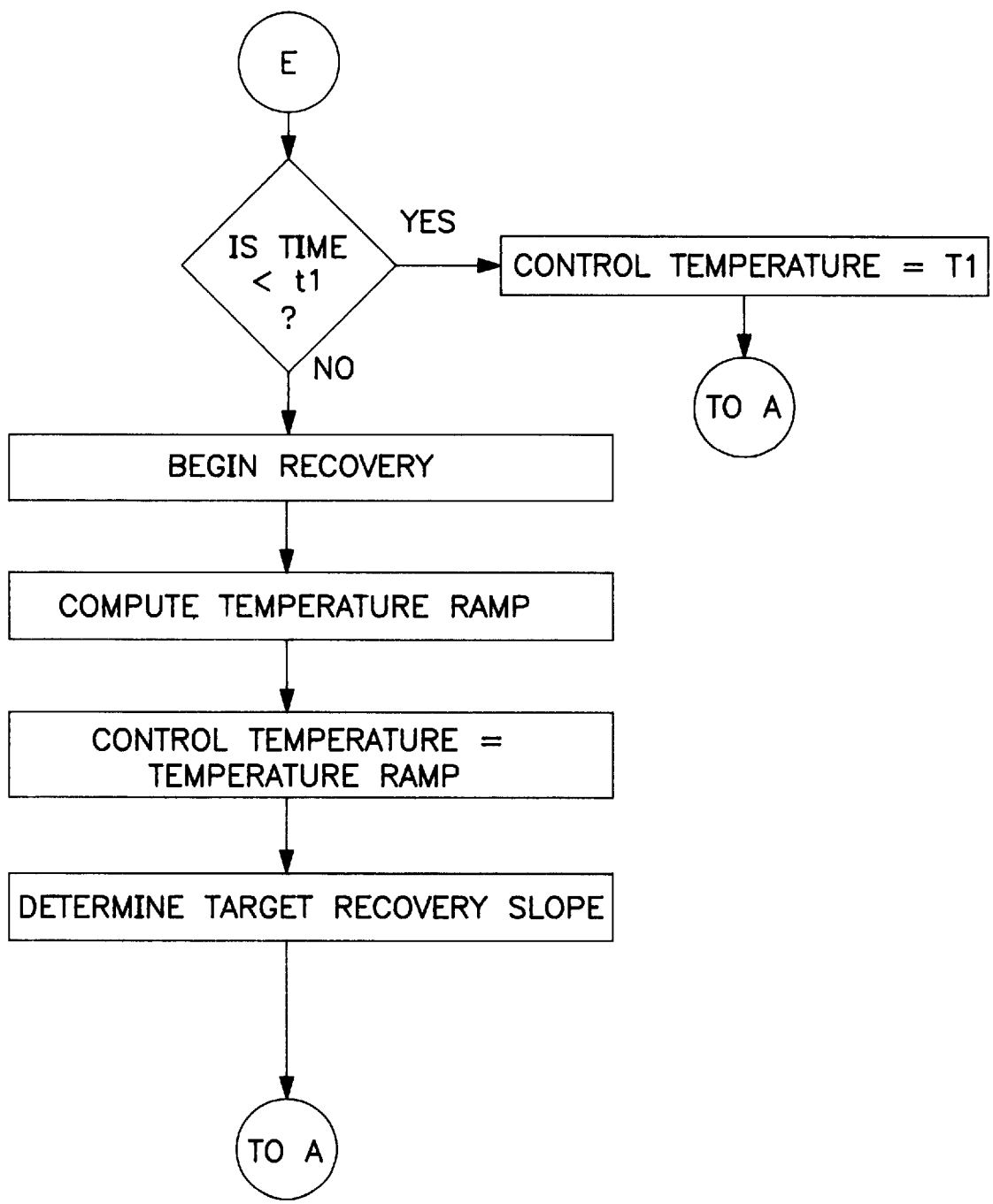
FIG. 5 is a schematic diagram of a further phase of operations of the setback recovery system according to FIG. 1.

If the time is not less than t2, the controller will sample the current temperature and determine if the current temperature is less than T2, the setpoint temperature during the setback operations. If the current temperature is less than T2, the heat pump will be operated to raise the temperature to T2 and maintain that temperature against the thermal load of the space (returning to step A to confirm the mode). If the current temperature is not less than T2, then the controller will proceed to step D (FIG. 4).

At step D, the controller determines whether the time elapsed is less than t1. If so, then the controller maintains the system at T1 and returns to A to confirm the mode of operation. If the time elapsed is greater than or equal to t1, then the recovery process is instituted. The temperature ramp is calculated according to the previously described relationships. The control temperature is then determined from the temperature ramp, which then enables a determination of the target recovery slope (rate of change of temperature over time). The mode of operation is then confirmed.

The operation during the cooling mode (step C) is substantially the same as described with respect to step B, except that when the current space temperature is determined (after setback mode has begun), the determination to maintain temperature T2 will be in response to a determination that the space temperature is greater than T2 (instead of less than). If the temperature is less than T2, then the controller proceeds to step E (FIG. 5), which is identical to step D.

For a house thermal conditioning system (preferably a gas engine driven heat pump system), the values for T1-4a and t1-4a may be preprogrammed into the computer, so that the controlling operation can begin with the current cycle. Thereafter, the data for each successive cycle will be maintained and utilized in calculating the values for each successive cycle.

Improved recovery can be achieved at lower cost by configuring the heating and cooling system to monitor and respond to weather changes. The strategy of recovery and setback (generally shown in FIG. 10.) currently employed in prior art thermostats use the elapsed time required for recovery from setback on the previous day, and counts backward from the desired time when recovery from setback is to be completed, by the amount of elapsed time for recovery, to determine the start time for activating the heat pump for the present recovery period. In accordance with FIG. 10, the prior art thermostats would start the recovery at time t4b−(t4a−t3a). The prior art method requires no sensor inputs other than a clock, indoor temperature sensor, and program schedule, which features are typically present in a standard programmable thermostat. The "intelligent recovery" of some prior art thermostats takes into account house load, and system capacity. However, the Honeywell system does not accommodate day-to-day changes in weather patterns, nor does it respond well when the setback program is modified.

With the benefit of the present disclosure, it is within the ordinary skill in the art to provide embodiments of the invention based on exponential characterizations that are equivalent to the currently preferred type described herein and are within the scope of the claims.

Current prior art strategy does not provide optimal use of the variable speed nature of a variable speed heating and cooling system during recovery. Instead, the prior art thermostats operates a heating and cooling system only at its maximum speed. The prior art thermostat determines the rate of change of house temperature; and when this rate of change is greater than that necessary to achieve the proper recovery at the time required, the heating or cooling unit is cycled off. When the rate of change is less than that which is necessary to achieve the proper recovery at the correct time, then the auxiliary heating system can be activated. The penalty in lost efficiency for using auxiliary heat is much greater than the penalty for cycling of the heating or cooling unit, so a margin is added to the time allowed for recovery, to suppress the use of auxiliary heating. This margin, however, increases the probability of cycling.

Recovery schemes according to the present invention make optimal use of available capabilities in variable speed heating and cooling equipment.

Figure 8:
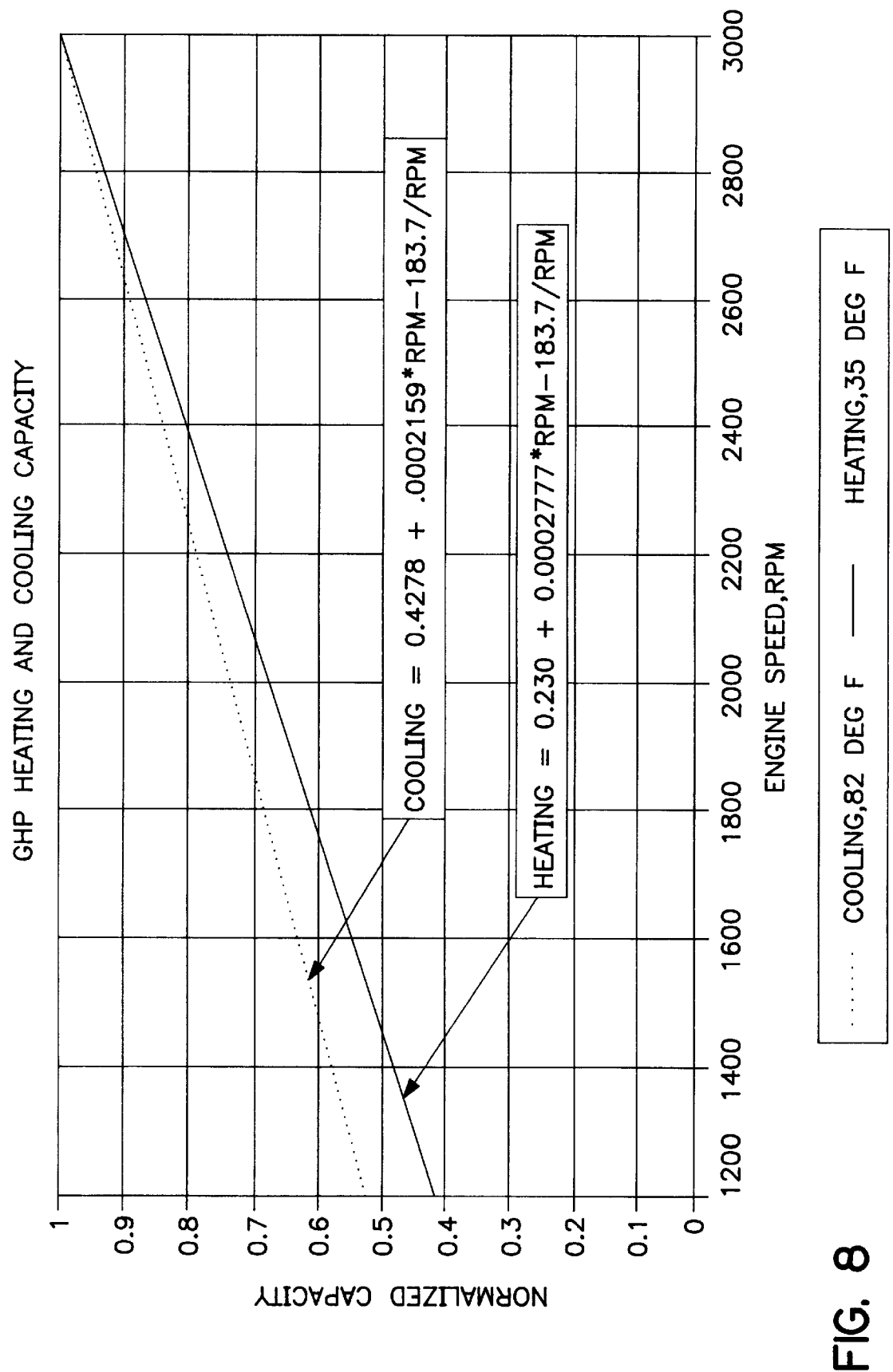
FIG. 8 is a plot of engine speed v. normalized thermal conditioning capacity, for a typical gas heat pump system.

A variable speed heating and cooling system preferably is controlled so that a target speed is selected for recovery. When the rate of recovery is greater than that required to meet the desired setpoint temperature at the desired time, the speed of the system will be reduced. When the rate of recovery is less than that required, the speed of the system will be increased. The relationship of system speed to system capacity is similar for any type of refrigerant-based variable speed heating or cooling system. This speed capacity relationship is shown in FIG. 8.

A secondary advantage of running at less than maximum speed is the reduction in associated noise of the system due to the reduction of the indoor blower speed. This advantage is especially valuable considering that many recoveries occur at times in the early morning, typically from about 4 am to 6 am.

Figure 10:
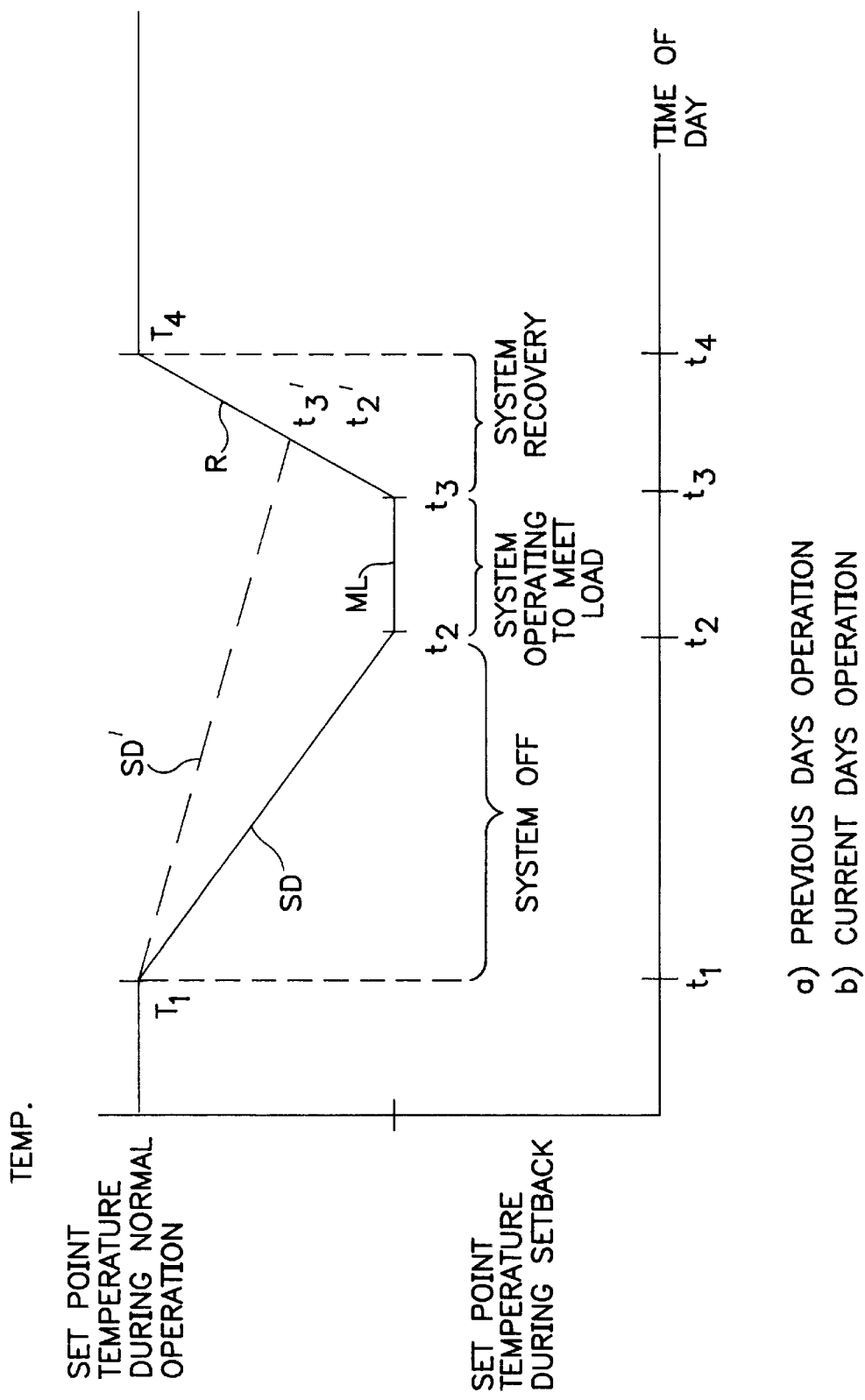
FIG. 10 is a diagram of a generalized recovery and setback cycle, during a single day (or other regular time interval), such as is employed with the present invention.

Under certain circumstances of weather and setpoint selections, the indoor temperature will never reach the setback temperature limit as shown by the setback decay line SD' in FIG. 10. Times t2' and t3' will be coincident at the intersection of the setback decay line SD' and the recovery line R. This is a fairly common circumstance; so the thermostat must be configured so that periodically during the setback period, the thermostat will compute an estimated time t3 based on the use of the current time for t2. When the estimated time t3 has passed, the thermostat will begin the recovery.

To simplify calculation of the time required for recovery, the recovery should be expressed as recovery time referenced to the maximum system speed. The equivalent recovery time at maximum system speed should be computed by integrating the time spent at lower speeds and relating the capacity delivered to the maximum system capacity. This procedure permits the concept of improved tracking to be applied to a variable speed system. Suitable mathematical relationships for determining the normalized capacity, during heating and cooling operations, versus engine speed for a typical gas engine for driving a heat pump compressor are shown in FIG. 8.

The target recovery speed can be selected to maximize savings depending upon the outdoor temperature and operating efficiency of any one type of system. Any one system will have a unique recovery speed at any given temperature that will maximize its efficiency. The selected target recovery speed should also be selected by taking into consideration the effects of savings due to allowing the house temperature to drift during the setback period, and should minimize the overall operating cost of the system. This will increase the target recovery speed above the speed at which maximum efficiency for the system occurs, which will permit lower overall operating costs by allowing the house temperature to drift for a slightly longer time.

Figure 9:
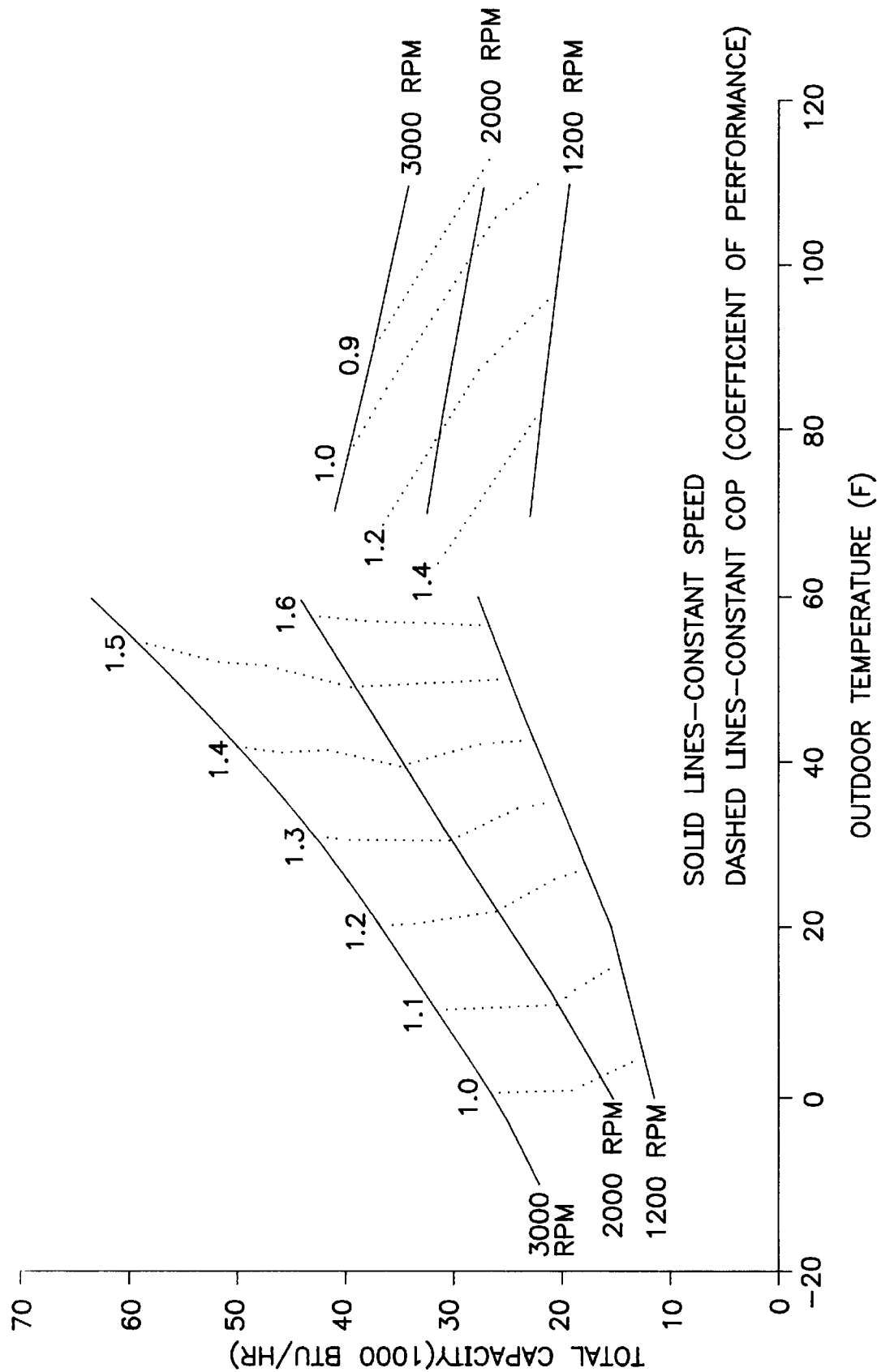
FIG. 9 is a plot of capacity and efficiency for a typical gas heat pump system, the plots for heating being on the left side and the plots for cooling being on the left side of the graph.

Once a target speed for recovery is selected, according to the general guidelines described herein, the recovery from setback operation can proceed according to the above procedures. FIG. 9 demonstrates that, for the GEHP operating in the heating mode, the optimum recovery speed for temperatures above 50° F. is at the minimum operating speed (e.g., 1200 rpm for a typical engine); at 40° F. an intermediate speed is optimum (e.g., 2000 rpm); and below 25° F. recovery should take place at maximum speed (e.g., 3000 rpm).

In cooling modes, the GEHP is most efficient at minimum operating speed (1200 rpm, typically). This condition also has the lowest operating cost for the homeowner. The recovery from setback in cooling should always be performed at minimum speed to maximize this benefit. Higher system speeds should be used when minimum speed is no longer capable of meeting the capacity required by the house. With this strategy in the cooling mode, actual setbacks are performed only on those generally rare occasions when the minimum system capacity is greater than the required house load. At lower house loads, operation during recovery eliminates cycling losses and some cost savings can be realized by a drift from the setpoint temperature. At higher house loads, setback is effectively eliminated, permitting maximum system efficiency while meeting the house load demands.

FIGS. 1–5 together form a flow chart showing the sequence of operations in a typical method according to the present invention for setback recovery by the thermostat used to control temperature in a predetermined region as provided by a variable speed heat pump system.

Figure 6:
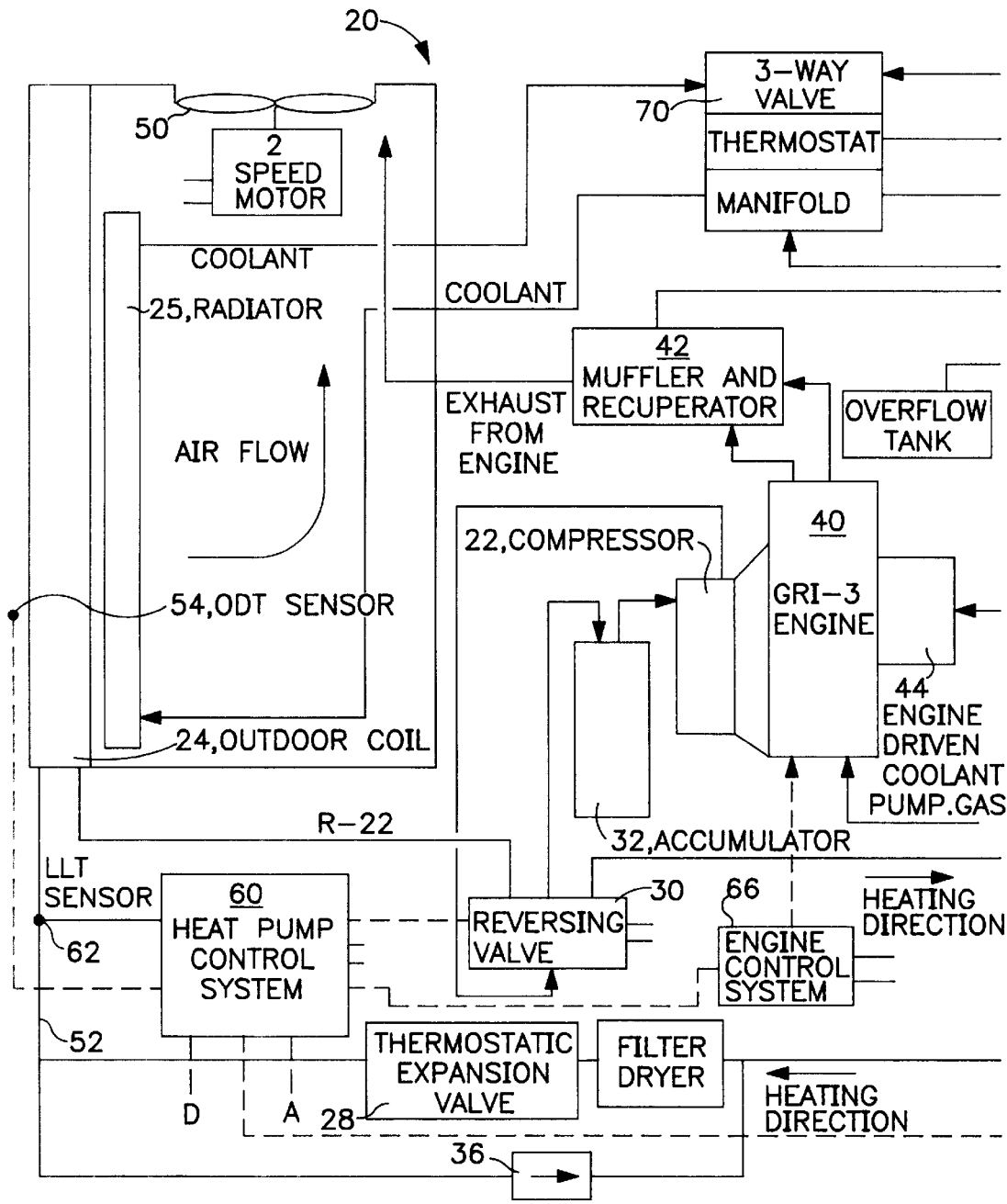
FIG. 6 forms the left side of a schematic diagram of a typical gas engine driven heat pump system which might employ the system according to the present invention.
Figure 7:
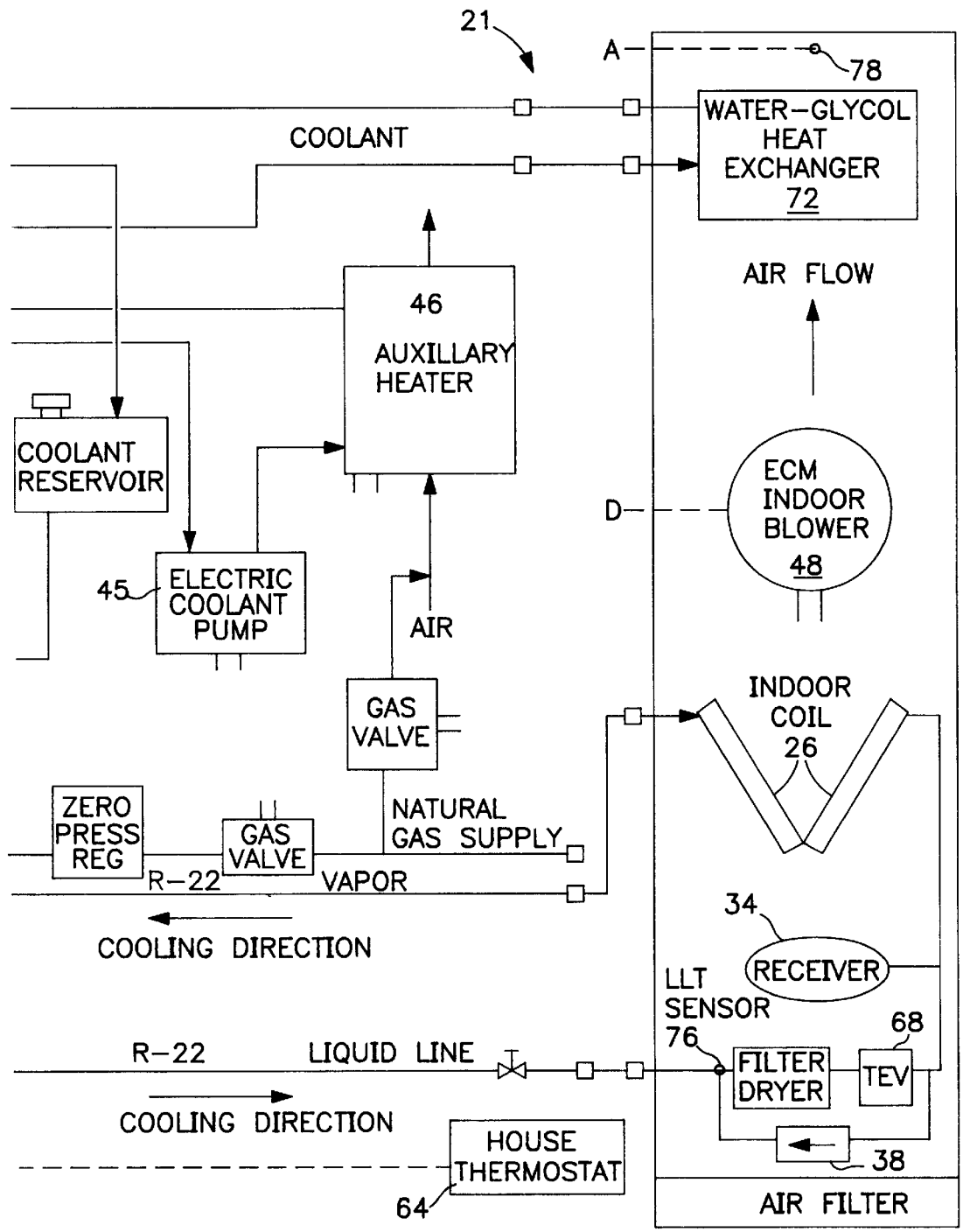
FIG. 7 forms the right side of the schematic diagram according to FIG. 6.

A thermal conditioning system including a typical gas engine driven heat pump in which the present invention can be advantageously applied is shown in FIGS. 6 and 7. Generally, any device that transfers heat away from a low temperature region to a higher temperature region may be referred to as a heat pump. For example, a refrigerator which transfers heat from its cooled interior to the warmer surrounding room is a heat pump, as is an air conditioner which transfers heat from the space being cooled to the warmer outside environment. Both of these heat pumping applications predate the current space conditioning heat pump. Now, the term "heat pump" is used to describe a reversible heat pumping device that can be used both for heating and cooling.

Various processes can be used to pump heat, including vapor compression, absorption, and desiccant systems. Vapor compression is the most commonly used system for residential space conditioning. The gas engine heat pump 20, 21 of FIGS. 6 and 7 uses a vapor compression based system.

The four main components of the gas engine heat pump system 20, 21 are the compressor 22, the condenser 24 or 26, the pressure reducing device 28 or 68, and the evaporator 26 or 24. The compressor 22 receives refrigerant vapor at low pressure and temperature from the evaporator 26 or 24 and discharges it at an elevated temperature and pressure. The high pressure vapor then enters the condenser 24 or 26 where its temperature is reduced sufficiently to cause the vapor to condense into liquid. Heat is given off from the refrigerant during condensation. The liquid refrigerant than passes through the pressure reducing device 28 where the pressure is reduced. The reduced pressure is sufficiently low that the liquid refrigerant begins to change phase. The refrigerant must absorb heat from the evaporator 26 or 24 to become vapor. The vapor then returns to the compressor 22 where the process begins again.

A heat pump is basically a reversible air conditioner. Thus, the relative location of the components which function as condenser and evaporator depend on whether the unit is heating or cooling the house. In the cooling mode, the condenser 24 is outside and the evaporator 26 is inside. In the heating mode, the components switch roles so that the evaporator 24 is outside and the condenser 26 is inside. The heat pump contains a reversing valve 30 which acts to reverse the direction of refrigerant flow when changing from cooling to heating. The reversing valve is also used as needed in the winter to defrost the outdoor evaporator 24. During defrosting, the vapor compression cycle is reversed to heat up the evaporator 24 to melt any frost that has formed.

A heat pump typically has several other parts that are not required for an air conditioner. A heat pump may also contain an accumulator 32 and possibly a liquid receiver 34 to store the excess refrigerant. A heat pump may have two pressure reducing devices 28; 68; one, 68, inside and one, 28, outside, and check valves 36, 38, that divert the refrigerant through them as the direction of the refrigerant flow changes.

The vapor compression portion of the gas engine heat pump 20, 21 is nearly identical to that of conventional electrically-driven heat pumps. The system 20, 21 is serviced with the same methods and equipment that are used for electrically-powered systems.

The most noticeable difference between gas and electrically-powered heat pumps is the power source for the compressor. A single-cylinder natural gas engine 40 is substituted for the electric motor of conventional systems. The gas engine 40 typically is capable of efficient continuous operation between about 1200 and 3000 RPM. Thus, the heat pumping capacity of the system 20, 21 can be varied continuously from 40 percent to 100 percent of maximum to match the requirements of the house and the weather. Variable speed operation means greater comfort, as on/off cycling is not required unless the load drops below 40 percent of the maximum. It also means greater efficiency, since the maximum efficiency is realized at reduced speeds.

As mentioned above, in a preferred embodiment of the invention, operation of the compressor engine will be as follows. When the outdoor temperature is 50° F. or higher, the engine speed during recovery will preferably be approximately 1200 revolutions per minute, for a typical gas engine configured for driving a compressor for a heat pump. If the outdoor temperature is approximately 40° F., the compressor will be driven at approximately 2000 rpm. If the outdoor temperature is 25° F. or lower, the compressor will be driven at approximately 3000 rpm. At temperatures between the aforementioned positions, the engine speed which will be used, can be arrived at through linear interpolation.

The engine cooling system is unique to the gas heat pump. The cooling system maintains the proper operating temperature of the engine regardless of outdoor temperature or operating conditions. In the winter, the waste heat from the engine 40 is rejected via a muffler and recuperator 42, and a pump 44 into a heat exchanger 26 in the house, to supplement the heat from the vapor compression system.

The ability to recover nearly all of the energy from the natural gas is what makes the gas engine heat pump so efficient in winter heating. It also provides for high delivered air temperatures in heating mode without sacrificing efficiency. This is possible because the heat from the coolant is added to the indoor air after it has already passed over the vapor compression heat exchanger. In the summer, the waste heat from the engine 40 is rejected into an outdoor radiator 25 mounted downstream of the refrigerant heat exchanger (the outdoor coil) 24.

The availability of the waste heat from the engine means that the gas engine heat pump can operate without supplemental heat at temperatures where electric heat pumps cannot. The heat pumping capacity of the vapor compression cycle decreases as the temperature difference between the evaporator and condenser increases. Typically, as the temperature outside approaches 30° F., the capacity of the vapor compression system diminishes to the point that supplemental heat is provided by expensive-to-operate electric resistance heaters. By adding the waste heat of the engine to the vapor compression cycle heat, the gas heat pump is capable of operating without supplemental heat at temperatures at least 20° F. colder. Through the use of the present invention, for most of the heating season, supplemental heat will rarely be required, even in northern climates. However, a gas-fired auxiliary heating system 46 has been included for use when needed. Supplemental heat comes on automatically during defrosting to prevent cold drafts, at temperatures below which the heat pump capacity is insufficient, if the vapor compression system fails, or if the outside temperature drops below −10° F. If the temperature drops below −10° F., the engine 40 shuts down to prevent damage to the compressor 22 and remains off until the temperature rises above −5° F. During such extreme cold operations, the auxiliary heating systems will bear the entire heating load of the residence, and accordingly must be sized to handle such loads.

Two optional auxiliary heating systems have been developed for the gas engine heat pump. One system uses a gas-fired boiler 46 in the outdoor unit to add additional heat to the engine coolant before it is pumped into the indoor heat exchanger 72. A separate electrically-driven coolant pump 44 is also provided so that the boiler can operate with the engine off. The other system (not shown) would use domestic hot water from the home water heater as a source of additional heat. A separate potable water heat exchanger is installed in the indoor unit along with the coolant heat exchanger 72. An electrically-driven circulating pump (not shown) moves water from the hot water tank to the heat exchanger and back to the hot water tank. A check valve is also included, to prevent unwanted thermal siphoning when the pump is turned off or set back.

Both systems have been successfully used in cold climates. The domestic water system is particularly desirable in warmer climates where the existing hot water tank generally has sufficient capacity. In colder climates, a larger hot water tank may be required.

A variable speed indoor blower 48 is used with the gas engine heat pump to minimize electrical consumption and maximize the comfort advantages of the variable speed engine 40. The fan speed varies smoothly in proportion to the engine speed to maintain a more constant delivered air temperature and humidity in the house. On moderate heating or cooling days, the fan will operate quietly and continuously at low speed for maximum efficiency. Efficient continuous fan operation can be provided at low speed for enhanced air filtration or reduced stratification in multi-storey houses.

A two-speed outdoor fan 50 is also used to minimize electricity consumption. Much of the time the fan is running at the quieter and more efficient low speed.

Figure 12:
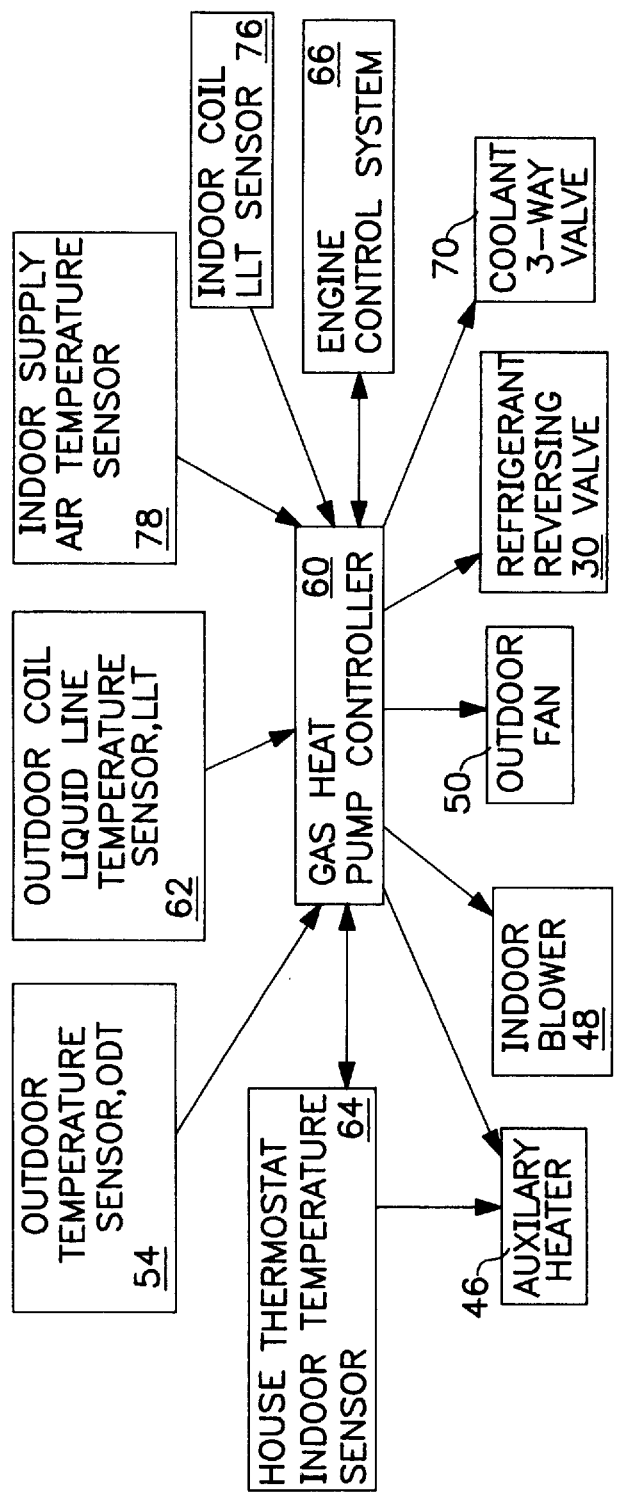
FIG. 12 is a block diagram of a typical control scheme according to the present invention, for controlling setback recovery in a heat pump system as illustrated in FIGS. 6 and 7.

FIG. 12 provides a highly schematic illustration of the relationship of heat pump controller 60 with the remaining components of the thermal conditioning system. A block diagram of a typical control apparatus for use in accordance with the present invention is provided in FIG. 11. The space thermostat will be a programmable thermostat (such as a suitably modified and reprogrammed Honeywell T8611 P-7019, although other current programmable setback thermostats may be used, if reprogrammed in accordance with the principles of the present invention), which will be capable of the illustrated command functions, as described, the individual specific features thereof being readily understandable to one of ordinary skill in the art having the present disclosure before them.

The space thermostat, according to the preferred embodiment, will be programmed, utilizing known programming techniques, to perform the functions described herein. An example of the programming which may be utilized is substantially set forth in the Appendix hereto entitled "GHP Thermostat Setback/Recovery Source Code".

The method for controlling the actuation of a heat pump system during setback and recovery is a method for determining the optimal time for commencing startup of a heat pump during a setback period, in order to achieve recovery at or before the desired time for achieving recovery, as predetermined by the user. The method requires that the temperature of the space being conditioned be recorded at certain preset times during each day, and at other times as described. In addition, the elapsed time between these various events are also recorded and stored.

When the system is first being installed and set up, times, temperature values and elapsed times for an imaginary "previous day" may be entered by hand by the programmer or be preset default values, which may be dependent upon the season.

The data which is recorded and stored during each 24-hour cycle is: the normal setpoint temperature (preset temperature during normal daytime operations); the time of the beginning of setback (as previously set by the operator) at which point the system is turned off or set back to allow the interior temperature to drift; the beginning setback setpoint temperature (the temperature which is to be maintained during the setback period), the time at the recording of the beginning setback setpoint temperature (which may change from day to date as the temperature decay rate changes), the time and temperature at the beginning of the recovery period, the time and temperature at the end of the recovery.

In a preferred embodiment of the invention, the controller operates the heat pump system in the following manner. During recovery, the compressor engine is initially driven at a predetermined engine speed, which is a function of the heating/cooling mode and/or the outdoor temperature conditions. The rate of recovery (temperature v. time) is monitored either continuously or periodically at short intervals. If the rate of recovery is established, within predetermined tolerances, such that the selected setpoint temperature will be attained at the selected time, the engine speed will be maintained at the predetermined speed. If the rate of recovery exceeds the tolerances, the engine speed will be reduced by an amount substantially proportional to the amount by which the rate of recovery exceeds the predetermined rate, until the rate returns to the desired rate, within the tolerances. If the rate of recovery falls short of the predetermined tolerances, the engine speed will be increased by an amount substantially proportional to the amount by which the rate of recovery falls below the required rate, until the rate returns to the desired rate, within the tolerances. The speed may be derived using standard control theory and techniques, such as a proportional integral control technique, which will establish a moving setpoint for the engine speed during recovery. Utilizing conventional programming techniques, a control scheme, employing the principles of the present invention can provide target recovery speeds which are both optimal from an efficiency standpoint, and establishes recovery at the desired time. In some instances the recovery speed may not be a maximum speed, but may be a lesser or even minimum speed, which would be optimal from the standpoint of energy usage.

During steady state operations, when the heat pump is being driven only to meet load, the engine speed is controlled in the following manner. The temperature is monitored either continuously or periodically at short intervals. If the temperature is established, within predetermined tolerances, the engine speed will be maintained at the predetermined speed. If the temperature exceeds the desired temperature, the engine speed will be reduced (or increased, depending upon whether the system is in heating or cooling mode) by an amount substantially proportional to the amount by which the temperature exceeds the predetermined or calculated desired temperature, until the temperature returns to the desired temperature, within the tolerances. If the temperature falls short of the desired temperature, the engine speed will be increased (or decreased) by an amount substantially proportional to the amount by which the temperature falls below the required temperature, until the temperature returns to the desired temperature, within the tolerances. As stated previously, the speed may be derived using standard control theory and techniques, such as a proportional integral control technique, which will establish a moving setpoint for the engine speed during recovery.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. In association with a thermal conditioning system for a space, the thermal conditioning system including a variable speed heat pump, wherein the thermal conditioning system operates between a first normal operations mode, and a second thermal conditioning setback mode, a method for the recovery of the thermal conditioning of the space from a setback period, the method comprising the steps of:

a) turning off or setting back the thermal conditioning system at a time t1a at the beginning of the first cycle of setback and recovery;

b) recording a normal setpoint temperature T1a when the thermal conditioning system is turned off or set back at the beginning of the first cycle of setback and recovery;

c) permitting the space temperature to drift, towards a predetermined beginning setback setpoint temperature T2a;

d) restarting the thermal conditioning system, at a time t2a, once a first predetermined condition has been achieved, toward maintaining the beginning setback setpoint temperature;

e) adjusting the operation of the thermal conditioning system, at a time t3a, toward recovery of the thermal conditioning of the space to normal operation during the first cycle of setback and recovery;

f) recording the ending setback setpoint temperature, T3a, when the thermal conditioning system is adjusted for setback recovery during the first cycle of setback and recovery;

g) adjusting the thermal conditioning system toward returning the thermal conditioning system to normal operation;

h) ending recovery by maintaining normal operation once a second predetermined condition has been attained;

i) recording the time t4a when setback recovery was ended during the first cycle of setback and recovery;

j) recording the ending normal setpoint temperature T4a when setback recovery was ended during the first cycle of setback and recovery;

k) turning off or setting back the thermal conditioning system at the time t1b at the beginning of a subsequent cycle of setback and recovery;

l) recording the normal setpoint temperature T1b when the thermal conditioning system is turned off or set back at the beginning of the subsequent cycle of setback and recovery;

m) permitting the space temperature to drift, towards a predetermined beginning setback setpoint temperature T2b;

n) turning on the thermal conditioning system at time t2b, once a predetermined third condition has been achieved, to maintain the desired setback thermal conditioning during the subsequent cycle of setback and recovery;

o) selecting the ending setback setpoint temperature T3b when thermal conditioning system is to be started for setback recovery during a subsequent cycle of setback and recovery;

p) selecting an ending normal setpoint temperature T4b at which point the setback recovery is to be ended during the current cycle of setback and recovery;

q) selecting a time t4b at which point the setback recovery is to be ended during the current cycle of setback and recovery;

r) determining the ending setback setpoint time t3b at which point the thermal conditioning system is to be started for setback recovery during the current cycle of setback and recovery; and s) restarting the thermal conditioning system at the determined ending setback setpoint time.

2. The method according to claim 1, further comprising the step of repeating steps a–r for each successive cycle of setback and recovery.

3. The method according to claim 1, wherein the step q) of determining the ending setback setpoint time t3b is accomplished in accordance with $$t3b=t4b-(t4a-t3a)*\{(T4b-T3b)/(T4a-T3a)*(T2b-T1b)/(t2b-t1b)/[(T2a-T1a)/(t2a-t1a)]\}.$$

4. The method according to claim 1, wherein the first predetermined condition comprises the attainment of the predetermined beginning setback setpoint temperature T2a.

5. The method according to claim 1, wherein the first predetermined condition comprises the passage of a predetermined amount of elapsed time following turn-off or set back of the thermal conditioning system.

6. The method according to claim 1, wherein the second predetermined condition comprises the attainment of a predetermined normal operations temperature.

7. The method according to claim 1, wherein the second predetermined condition comprises the passage of a predetermined amount of elapsed time.

8. The method according to claim 1, wherein the thermal conditioning system is a gas engine driven heat pump.

9. The method according to claim 1, wherein the third predetermined condition comprises the attainment of the predetermined beginning setback setpoint temperature T2b.

10. The method according to claim 1, wherein the third predetermined condition comprises the passage of a predetermined amount of elapsed time following turn-off or set back of the thermal conditioning system during the subsequent cycle.

11. The method according to claim 1, further comprising the step of periodically calculating the ending setback setpoint time t3b at which point the thermal conditioning system is to be started for setback recovery during the current cycle of setback and recovery, utilizing the current time at each periodic calculation as the value for the time t2b, when the current time is later than the original time t2b and the space temperature is greater than T2b, if the system is in a heating mode, or the space temperature is less than T2b, if the system is in a cooling mode.

12. A thermal conditioning system for the thermal conditioning of a space, the thermal conditioning apparatus being configured to operate in a normal operations mode and a setback operations mode, the thermal conditioning system comprising:

means for providing thermally conditioned air to a space;

means for sensing the temperature of the air in the space;

user programmable means for regulating the operation of the means for providing thermally conditioned air so as to maintain a substantially constant air temperature in the space, the user programmable means being further configured to vary the rate at which thermally conditioned air is supplied to the space according to a time-referenced schedule such that the rate of thermal conditioning is setback for a period of time at substantially regular intervals of time, the thermal conditioning system thereafter undergoing recovery from the setback operation to normal operations, the user programmable means being operably connected to the means for providing thermally conditioned air to the space, the sensing means, the recording means and the correlating means, the user programmable means further including means for accommodating changes in loading on the means for providing thermally conditioned air such that recovery from setback operation occurs at substantially the same time during each of said substantially regular intervals of time.

13. The thermal conditioning system according to claim 12, wherein the means for accommodating changes in loading further comprises:

means for recording the temperature of the air in the space;

means for correlating the recorded temperatures to a time reference; and means for determining when to increase the rate of delivery of thermally conditioned air to the space during recovery, relative to changes in loading on the thermal conditioning system, in order to accomplish recovery at substantially the same time during each of the regular intervals of time.

14. The system according to claim 13, wherein the means for determining when to increase the rate of delivery of thermally conditioned air during recovery operates according the to the relationship $$t3b=t4b-(t4a-t3a)*\{(T4b-T3b)/(T4a-T3a)*(T2b-T1b)/(t2b-t1b)/[(T2a-T1a)/(t2a-t1a)]\}$$

wherein t1a=time when system enters setback operation at beginning of a first interval of time;

T1a=normal setpoint temperature when system enters setback operation at beginning of the first interval of time;

t1b=time when system enters setback operation at beginning of a subsequent interval of time;

T1b=normal setpoint temperature during system setback operation during the subsequent interval of time;

T2b=beginning setback setpoint temperature during system setback during the subsequent interval of time;

t2b=time when system established beginning setback setpoint temperature during system setback during the subsequent interval of time;

T3a=ending setback setpoint temperature during first interval of time, at beginning of recovery;

t3a=time when recovery is begun during the first interval of time;

T3b=ending setback setpoint temperature when recovery is begun during subsequent interval of time;

T4a=ending normal setpoint temperature when recovery is ended during first interval of time;

t4a=time when setback recovery is ended during first interval of time;

T4b=ending normal setpoint temperature when recovery is ended during the subsequent interval of time;

t4b=time when the setback recovery is to be ended during the subsequent interval of time;

t3b=ending setback setpoint time when the recovery is to be started during the subsequent interval of time.

15. The system according to claim 13, wherein the means for accommodating changes in loading is further operably configured to monitor the rate of recovery of the system to normal operation and cause the user programmable control means to further vary the rate of delivery of thermally conditioned air, relative to ongoing changes in loading of the system.

* * * * *